United States Patent Office 3,556,859
Patented Jan. 19, 1971

3,556,859
DRY BATTERY WITH METAL PLATE OVERLAPPING THE ZINC ANODE
Soichi Ohki, Tokyo, Japan, assignor to Toshiba Ray-O-Vac Co., Ltd., Shinagawa-ku, Tokyo, Japan, a corporation of Japan
Filed Nov. 6, 1968, Ser. No. 773,906
Int. Cl. H01m 21/06
U.S. Cl. 136—107                          2 Claims

ABSTRACT OF THE DISCLOSURE

A dry battery comprising a cylindrical member made of thermoplastic synthetic resin and provided at the upper sealed part with a cathode terminal cap, and a zinc can, a component of a power generating element, inserted into the cylindrical member from the bottom opening, said can being filled with other power generating components including a carbon rod, a depolarizing agent surrounding it, an electrolyzing paste disposed around the outer circumference of said agent and an insulating bottom plate, particularly characterized in that there is positioned an anode metal plate below the bottom of the zinc can, the upwardly bent periphery of said anode metal plate contacts the outer periphery near the bottom of the zinc can, said upwardly bent peripheral edge of the anode metal plate is again bent downward to form a folded section with a free space allowed therein, and the bottom peripheral edge of the aforesaid cylindrical member of thermoplastic resin is thermally bent up and inserted into said space with external pressure so as to seal the bottom of the plastic cylindrical member.

BACKGROUND OF THE INVENTION

Heretofore, a dry battery armored with plastic material has in many cases been prepared by inserting a zinc can, a component of a power generating element which is filled with other power generating members, into a cylindrical member of plastic material, disposing a cathode metal plate at the uper part of the zinc can and tightly attaching an anode metal plate to the underside of the bottom of the zinc can and thereafter thermally bending the top and bottom peripheral edges of the cylindrical member inwardly so as to form a completely sealed assembly. In addition to this method of sealing the openings of the cylindrical member, there have been adopted other processes, for example, the process of thermally fusing together the bent peripheral edges of the cylindrical member and a seal plate or embedding the seal plate in either the top or bottom opening of the plastic cylindrical member, followed by molding. However, since the cylindrical member was made of plastic material which had a lower flexural strength than that of metal material, the above-listed conventional sealing methods had several drawbacks. For instance, the thermal fusion process involved complicated steps with the resultant loss of the visual appeal of the final product. The process of embedding a seal plate was handicapped by the fact that although the embedding of a seal plate in one of the openings of a cylindrical member was easy because it was carried out prior to the insertion of a zinc can, the sealing of the other end was extremely difficult. Therefore, the conventional sealing methods were accompanied with various shortcomings, for example, that imperfect sealing caused the electrolyte to leak out due to the pressure of gases evolved in the battery or there occurred poor electrical contact between the zinc can and anode seal plate.

SUMMARY OF THE INVENTION

The present invention relates to a dry battery wherein a cylindrical member of plastic material housing a zinc can, a power generating component, filled with other power generating components is improved in its sealing construction, said plastic cylindrical member is expanded by the pressure of gases evolved in the battery thereby to prevent the electrical contact between the zinc can and anode seal plate from being loosened and also render the battery completely free from the leakage of the electrolyte.

DESCRIPTION OF THE PREFERRED EMBODIMENTS

Figure 1:
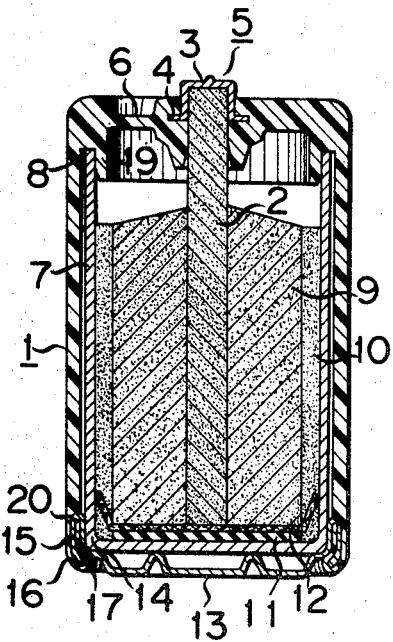
FIG. 1 is a longitudinal section of a dry battery according to an embodiment of the present invention.

Referring to FIG. 1, numeral 1 represents a cylindrical member made of thermoplastic synthetic resins resistant to corrosion by electrolyte, for example, polyethylene, polyvinyl chloride, polypropylene or polystyrene. The upper seal section 5 of the cylindrical member is perforated in the center with a bore into which a carbon rod 2 is fitted. The top of the bore is provided with a cathode metal cap 3 to cover the head of the carbon rod. The flange 4 of the cap is embedded from the side of the bore of the seal section 5. A part of the seal section 5 consists of a thin film layer 6 which allows hydrogen gas evolved during the discharge of a dry battery to permeate therethrough to the outside. On the inside of the seal section 5 is formed an annular protuberance 19 so as to define an annular groove 8 between said protuberance 19 and the inside of the wall of the cylindrical member 1. Into the annular groove 8 is securely fitted the upper end of the zinc can 7. The can 7 is filled with a depolarizing agent 9 in a manner to surround the carbon rod, an electrolyte paste 10 disposed around the outer circumference of the depolarizing agent 9. On the bottom of the zinc can 7 is placed an insulating bottom plate 11 with an intervening sheet of paper 12 wrapping the bottom of the charged depolarizing agent. When the zinc can 7 is inserted into the cylindrical member 1 the head of the carbon rod 2 fits in with the cathode metal cap 3.

The peripheral edge of the anode metal plate 13 disposed on the underside of the bottom of the zinc can 7 consists of an upward bent portion 15 and downward bent portion 16 to form a folded section with a free space 20 allowed therein. The upward bent portion 15 defining a right angle provided on the peripheral edge of the anode metal plate 13 contacts the outer peripheral edge near the bottom of the zinc can 7 which is also bent at a right angle. The bent-up bottom portion 17 of the plastic cylindrical member 1 is inserted into the aforesaid space 20 in the folded section. Said bent-up portion is tightly clamped between the upward bent portion 15 and downward bent portion 16 with an externally applied pressure. The bent-up portion 17 has a slightly smaller thickness than that of the body of the cylindrical member 1 so as to ease the bending operation in fabrication.

Figure 2:
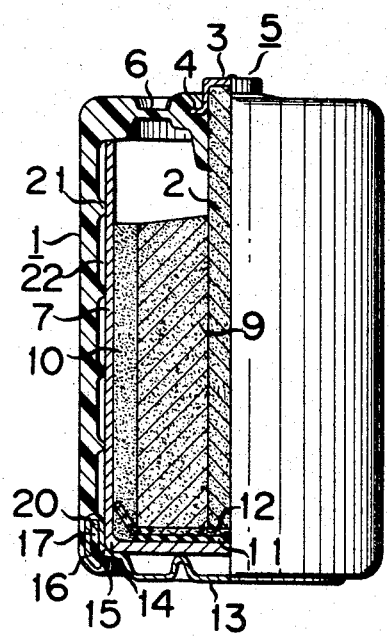
FIG. 2 is a longitudinal section of a part of a dry battery according to another embodiment of the invention.

There will now be described another embodiment of the present invention by reference to FIG. 2. The same parts of this figure as those of FIG. 1 are denoted by the same numerals and description thereof is omitted.

On the inside surface of the body of the cylindrical member 1 made of thermoplastic resin are spatially formed a plurality of annular protuberances 21. The outer diameter of the zinc can 7 is made slightly larger than the inner diameter of the cell as defined by the furthest end of said protuberances. When the zinc can 7 is inserted into the cylindrical member there are formed a plurality of void spaces between the inner surface of the cylindrical member 1 and the outer surface of the zinc can 7. According to the foregoing embodiment, the bottom opening of the cylindrical member 1 has the same seal construction as in the embodiment of FIG. 1.

The dry battery of the present invention having the aforementioned construction causes the bore for receiving the head of a carbon rod perforated in the upper seal section of the cylindrical member 1 of thermoplastic synthetic resin to be tightly closed by embedding the flange 4 of the cathode metal cap 3 in the cylindrical member 1, so that there is no possibility of electrolyte leaking from the upper seal opening. Further, the present dry battery allows gases evolved in the cylindrical member 1 to permeate to the outside through the thin film layer 6 formed in the upper seal section. In the bottom seal section, the anode metal plate is attached to the underside of the bottom the zinc can 7 for electrical connection. The upward bent portion 15 of the anode metal plate 13 concurrently used as a seal plate fits in with the peripheral edge near the bottom of the zinc can 7. And the bent-up bottom peripheral edge of the cylindrical member 1 is inserted into the space 20 formed between the upward and downward bent portions on the peripheral edge of the anode metal plate 13, thereby to be tightly clamped therebetween by an externally applied pressure. Accordingly, when the cylindrical member 1 is expanded by the pressure of gases evolved therein, the anode metal plate 13 concurrently used as a seal plate is tightly pressed to the zinc can 7 so as to ensure good electrical connection between said cell and plate and prevent the electrolyte from leaking from the bottom of the battery.

In another aspect of the invention, there are spatially formed a plurality of annular protuberances 21 on the inside surface of the body of the cylindrical member 1. These annular protuberances 21 are pressed to the outer circumference of the zinc can 7 thereby to cause a plurality of independent void spaces 22 to be formed. These spaces are intended to trap portions of electrolyte leaking from the apertures which may often be naturally bored through the wall of the zinc can 7 during the discharge or storage of a dry battery thereby completely to prevent the electrolyte from being released to the outside from the bottom seal section of the cylindrical member 1 said annular protuberances 21 pressed to the outer circumference of the zinc can 7 further have the effect of allowing the cylindrical member 1, zinc can 7, electrolyte paste 10, depolarizing agent 9 and carbon rod 2, to be in contact with each other as closely as possible at all times.

What is claimed is:

1. A dry battery comprising:
   (a) a cylindrical housing hollow body made of a thermoplastic resin having an upper seal section with a bore in the center thereof, a part of the surface of said seal section consisting of a thin film layer;
   (b) a cathode terminal cap covering said bore having a flange embedded in said upper seal section;
   (c) a bottom opening in said cylindrical hollow body with an upward bent peripheral edge of a smaller thickness than that of said hollow body;
   (d) a power generating element housed in the cylindrical member consisting of a zinc can and other power generating components therein including a carbon rod inserted into said cathode terminal cap, a depolarizing agent surrounding the carbon rod, an electrolyte paste disposed around the outside of the depolarizing agent and an insulating plate positioned at the bottom of the zinc can; and
   (e) an anode metal plate attached to the underside of the bottom of the zinc can for electrical contact, the peripheral edge of said metal plate overlapping a portion of the zinc can and being bent upwards so as to contact the outer peripheral edge of the bottom of the zinc can and then downwards for tight contact and elimination of electrical leakage forming a folded section with a space therein, the bent-up bottom peripheral edge of the cylindrical housing hollow body being inserted into said space to be clamped with externally applied pressure.

2. A dry battery according to claim 1, wherein the inner surface of the cylindrical member made of thermoplastic synthetic resin has a plurality of annular protuberances whose inner surface diameter is slightly smaller than that of the outer surface of the zinc can arranged at substantially equal intervals in a longitudinal direction, so as to cause a plurality of void spaces to be defined by said annular protuberances between the inside of the cylindrical housing hollow body and outside of the zinc can when it is inserted into said cylindrical housing hollow body.

References Cited

UNITED STATES PATENTS

| | | | |
|---|---|---|---|
| 1,500,477 | 7/1924 | Warncke | 136—102 |
| 3,179,537 | 4/1965 | Reilly | 136—107 |
| 3,184,341 | 5/1965 | Reilly | 136—107 |
| 3,212,935 | 10/1965 | Reilly et al. | 136—107 |
| 3,214,298 | 10/1965 | Urry | 136—107 |
| 3,255,049 | 6/1966 | Wolfe | 136—107 |
| 3,278,340 | 10/1966 | Bell | 136—107 |
| 3,338,750 | 8/1967 | Urry | 136—107 |

ALLEN B. CURTIS, Primary Examiner

C. F. LEFEVOUR, Assistant Examiner

U.S. Cl. X.R.

136—133